United States Patent [19]

Witzke

[11] Patent Number: 4,603,907

[45] Date of Patent: Aug. 5, 1986

[54] J-CLIP MOUNTING SYSTEM FOR LOAD BEARING SEAT MEMBERS

[75] Inventor: Duane W. Witzke, Logan, Ohio

[73] Assignee: Hoover Universal, Inc., Ann Arbor, Mich.

[21] Appl. No.: 556,482

[22] Filed: Nov. 30, 1983

[51] Int. Cl.⁴ .............................................. A47C 7/02
[52] U.S. Cl. .............................. 297/452; 297/DIG. 1; 297/DIG. 2
[58] Field of Search ........... 297/452, DIG. 1, DIG. 2

[56] References Cited

U.S. PATENT DOCUMENTS

| | | | |
|---|---|---|---|
| 3,179,469 | 4/1965 | Heuston | 297/452 |
| 3,210,782 | 10/1965 | Buist et al. | 297/452 |
| 3,310,300 | 3/1967 | Lawson | 297/452 |
| 3,451,075 | 6/1969 | Woodard | 297/452 |
| 3,557,264 | 1/1971 | Getz et al. | 297/452 |
| 3,610,688 | 10/1971 | Arnold | 297/452 |
| 3,675,970 | 7/1972 | Bereday | 297/452 |
| 3,844,614 | 10/1974 | Babbs | 297/452 |
| 4,147,336 | 4/1979 | Yamawaki et al. | 297/452 |
| 4,492,408 | 1/1985 | Lohr | 297/452 |

Primary Examiner—Francis K. Zugel
Attorney, Agent, or Firm—Stephenson and Boller

[57] ABSTRACT

A vehicle seat assembly which includes a frame having side rails with upright webs and upper flanges and a load carrying pre-stretched web mounted on and extending between the side rails. A plurality of J-clips are provided for mounting the web on the side rails so as to maintain the web in its pre-stretched condition.

5 Claims, 6 Drawing Figures

J-CLIP MOUNTING SYSTEM FOR LOAD BEARING SEAT MEMBERS

BACKGROUND OF THE INVENTION

This invention relates generally to the field of seating and more particularly to seat assemblies for use in vehicles such as automobiles and the like. In the past, most automobile seating involved the use of foam and some type of metal springs. The primary function of the springs was to provide added structural support. During quick loading of the seat or during long-term continuous use of the seat, the seat occupant could feel the springs which thus became a source of discomfort.

More recently, seat assemblies have been developed in which the load bearing seat member is a web or sheet of material that can be tensioned and which functions as a support member encapsulated within a foam body. The web or sheet is preferably a matrix of fibrous material which is attached to the frame and operates like a network of filaments, as disclosed in co-pending application Ser. No. 437,715 filed Oct. 29, 1982 and assigned to the assignee of this application.

The present invention provides improved structure for mounting load bearing webs or sheets on the seat frame. Past methods of attaching spring support systems to the frame have necessitated discrete attachment locations and are thus not adaptable to a system for mounting a web on a frame. These spring support systems are inconsistent with the goal in a web mounting of uniform load distribution, and would result in locally high stressing of both the membrane and the seat frame. It is an object of this invention, therefore, to provide web attachment structure which provides for a continuous attachment of the web to the frame to thereby take full advantage of the uniform web load carrying characteristics.

SUMMARY OF THE INVENTION

The vehicle seat assembly of this invention comprises a main structural frame and a pre-tensioned load-supporting web which is mounted at its ends on the frame and spreads the loads of the occupant over a larger area, thereby allowing for thinner seats without causing local pressure points. The vehicle seat frame has a cushion support portion which includes a pair of side rails having upright webs and upper flanges which extend outwardly from each other and may or may not have down-turned extensions at their outer edges. A load-carrying membrane is mounted on and extends between the side rails, the mounting being facilitated by the J-clip mounting members of this invention.

The mounting members are formed of a structural plastic strip which is shaped so that it is return bent upon itself in cross section, thereby resembling a "J" shape in cross section. The mounting strips are secured by a continuous connection or seam, such as by sewing, sonic welding, di-electric bond, chemical bonding, etc., to the membrane. The open ends of the strips are then hooked over the main frame flanges so as to maintain the prestretched condition of the membrane. The result is a mounting of the membrane in which it is uniformly stretched so that all portions of it will provide uniform resistance to seating loads. This avoids localized stress areas in both the membrane and the frame to thereby enable the membrane and the frame to be constructed of a minimum amount of material which will provide the desired seating comfort without adding to the cost and weight of the vehicle.

Further objects, features and advantages of this invention will become apparent from a consideration of the following specification when taken in connection with the appended claims and the accompanying drawing in which:

Figures 1, 2:
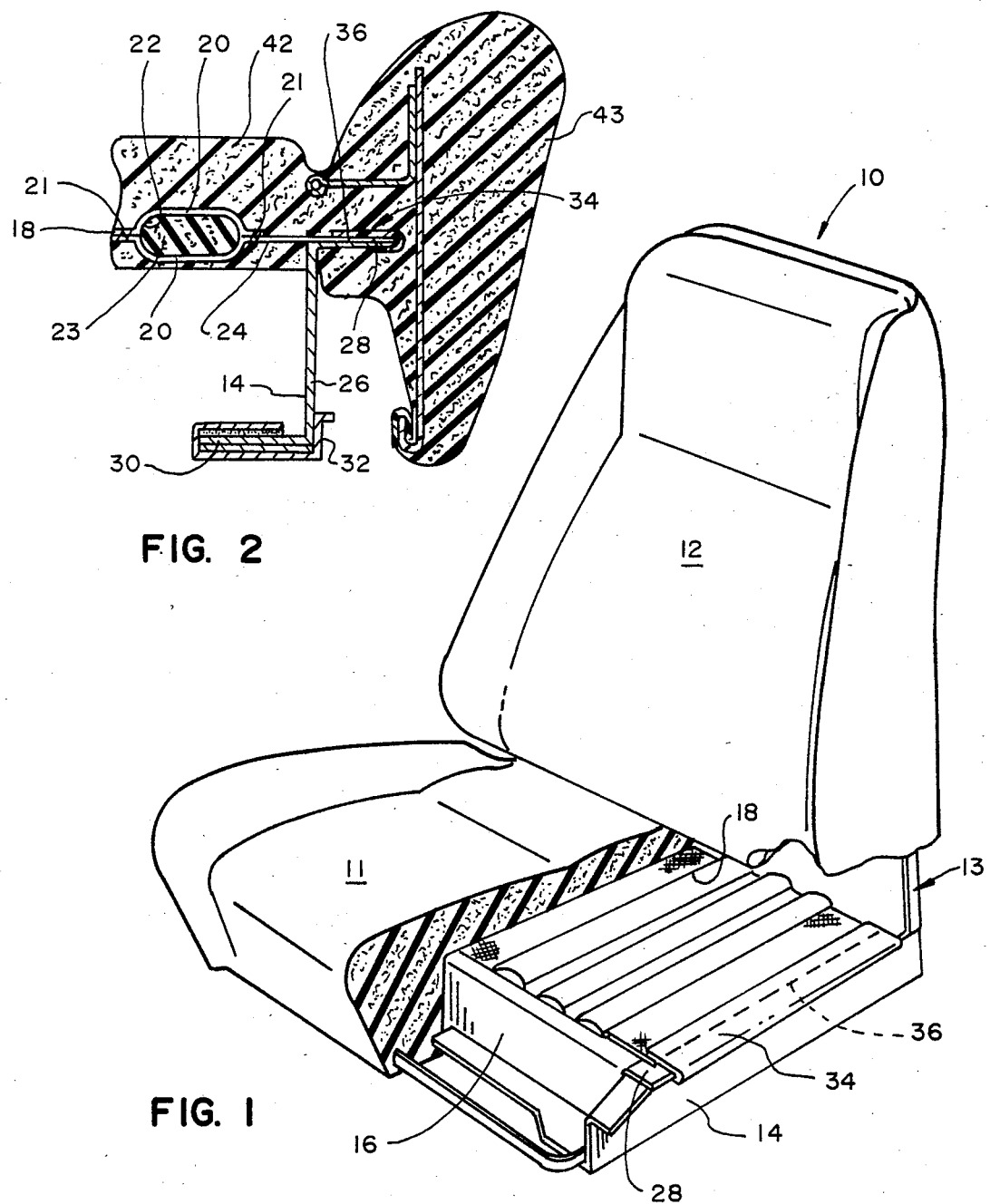
FIG. 1 is a perspective view of the seat assembly of this invention with some parts broken away and other parts shown in section for the purpose of clarity.
FIG. 2 is a fragmentary enlarged sectional view of a portion of the seat assembly shown in FIG. 1.

With reference to the drawing, the seat assembly of this invention, indicated generally at 10, is illustrated in FIG. 1 as having a cushion portion 11 and a back portion 12. The seat assembly 10 includes a main structural frame 13 having side rails 14, only one of which is shown, and a front rail 16. The assembly also includes a load supporting web or sheet 18 which extends between the rails 14 and supports the seating load of the occupant.

The web 18 can take many forms. For example, it can be of the form shown and described in co-pending application Ser. No. 437,715, which description is incorporated herein by reference, consisting essentially of a sheet or membrane of woven fibrous material having filaments extending both parallel to the side rails 14 and side-to-side between the rails 14. Also the web 18 can take the form illustrated in FIGS. 1 and 2 which illustrate the web 18 as consisting of a pair of woven fibrous membranes 20, like the membrane that is illustrated and described in the above referenced co-pending application, which are connected by seams 21 and shaped to provide spaces 22 which enclose elongated ribs or pillows 23 of foam material which are elongated in a direction fore and aft of the seat 10 and extend in directions generally parallel to the side rails 14. The pillows 23 are spaced apart in directions transversely of the side rails 14 and function to enhance the ability of the web 18 to impart confort to users of the seat 10.

Figure 3:
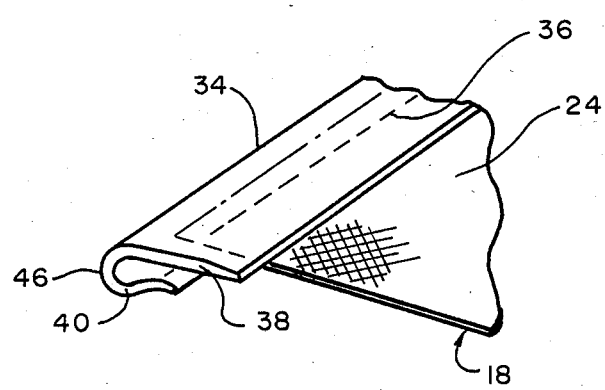
FIG. 3 is a fragmentary perspective view illustrating one form of the J-clip mounting member of this invention and the attachment thereof to a load bearing membrane.

The web 18 has a pair of end portions 24, only one of which is shown, that constitute, in the illustrated embodiment of the invention, end portions of the lower membrane 20. The end portions 24 are identical and are identically mounted on the side rails 14 and, for this reason, only one end portion 24 is illustrated in the drawing and described herein. As shown in FIG. 2, each side rail 14 has an upright web 26 and upper and lower flanges 28 and 30, respectively, which extend in horizontally opposite directions from the web 26. The lower flange 30 is supported in a frame assembly 32 that is secured to the floor of the vehicle in which the seat 10 is mounted. The upper flange 28 extends outwardly with respect to the seat cushion portion 11 to thereby extend the load supporting surface of the web 18 in horizontal directions. As shown in FIGS. 1, 2 and 3, a continuous strip 34 of plastic material is secured by a continuous seam 36 to the end portion 24 of the web 18. The seam 36 can be formed by sewing, welding, bonding, or the like, to insure a continuous attachment of the J-strip 34 to the membrane end portion 24 over the full length of the web 18 in a direction fore and aft of the seat 10.

The strip 34 is referred to as a "J-strip" because it is of a return bent upon itself configuration so that it has a pair of generally parallel legs 38 and 40 and when these legs are positioned so that they are upright, the cross sectional shape of the strip 34 resembles the letter "J". The leg 38 is longer than the leg 40 and is secured by the seam 36 to the web end portion 24, the leg 40 being positioned below the leg 38 at each end of the web 18.

The web 18 is stretched, during assembly of the web 18 with the frame rails 14, so as to induce tension of a predetermined magnitude into the filaments of the membranes 20 which extend side-to-side. The mounting strips 34 are then hooked over the side rail flanges 28 as shown in FIG. 2 to securely mount the web 18 on the rails 14 in a position in which the pre-stretching of the web 18 is maintained.

A foam body 42 of conventional bucket seat shape is molded in place on the frame 13 so as to enclose the web 18 and the rails 14. In the illustrated seat 10, the body 42 includes side bolsters 43 of foam material that encompass the mounting strips 34 and the flanges 28. Encapsulation takes place with the web 18 in a substantially horizontal condition in which it will support and yieldably resist downwardly directed seating loads applied to the seat cushion 11. The foam in the body 42 functions to lock all of the fibers or filaments in the web 18 together to provide for the desired distribution of seating loads throughout the web 18 and avoid areas of stress concentration. The foam also functions to shrink the web 20 to further induce tension in the web 18 and insure its ability to comfortably resist seating loads. The foam in the body 42 can be of any suitable foam material such as a urethane foam of the type used and described in detail in U.S. Pat. No. 3,142,073.

Figure 4:
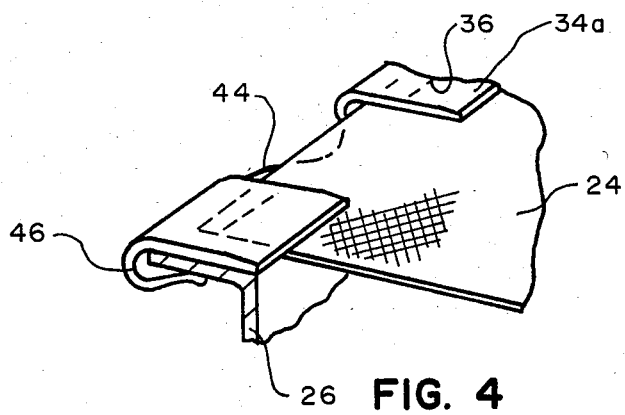
FIGS. 4, 5 and 6 are views like FIG. 3 showing modified forms of the clip and membrane assembly shown in FIG. 3.
Figure 6:
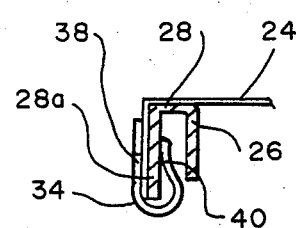
Figure 5:
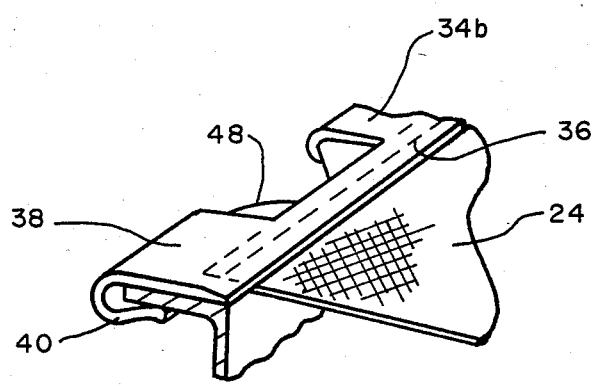

FIGS. 4, 5 and 6 illustrate modified forms of the assembly of the web 18 with the side rails 14. The embodiments shown in FIGS. 4 and 6 are intended for use in seat structure environments in which other structural parts of the seat interfere with the continuity of the mounting strips 34.

In the embodiment illustrated in FIG. 4, the modified mounting strip 34a is formed with a notch 44 which extends through the base portion 46 of the strip which connects the legs 40 and 38. By virtue of the notch 44, another structural element in the seat 10 can be located adjacent the end portion 24 of the web 18. In the embodiment of the invention illustrated in FIG. 5, both the leg 38 and the leg 40 are continuous, but a notch 48 is formed in the strip 34b which extends through the base portion 46.

In the embodiment of the invention shown in FIG. 6, the side rail flange 28 is provided with a downward extension 28a and the strip 34 is hooked over the flange extension 28a, the end result being the same as in the embodiment illustrated in FIG. 2.

From the above description, it is seen that this invention provides a vehicle seat assembly 10 in which a foam encapsulated web 18, which can also be alternatively described as a membrane, sheet, or the like, cooperates with the mounting strips 34, 34a and 34b and the side rail flanges 28 to provide for mounting of the web 18 on the seat frame 13 so as to effectively resist seating loads. A seat with improved comfort characteristics is thus achieved.

What is claimed is:

1. In a vehicle seat which includes a frame having a cushion portion, said cushion portion including a pair of side rails having upright portions and upper flanges which extend outwardly from each other, a load carrying web adapted to be mounted on and extend between said side rails, a foam body on said frame and extended upwardly from and secured to said web and mounting members secured to said web and mounted on said upper flanges, said mounting members constituting the sole support for said web on said frame for maintaining said web in tension on said flanges, said mounting members comprising substantially continuous strips secured to opposite edges of said membrane, each of said strips being of a return bent upon itself shape in cross section and being hooked over one of said flanges.

2. The mounting for a load carrying web in a vehicle seat set forth in claim 1 wherein said side rail flanges are generally horizontal and said strips are likewise generally horizontal and generally parallel to said flanges.

3. The mounting for a load carrying web in a vehicle seat set forth in claim 2 wherein said strips are notched intermediate their ends.

4. The mounting for a load carrying web in a vehicle seat set forth in claim 1 wherein each of said strips has an upper leg and a lower leg and a base portion extending therebetween, and wherein a notch is formed in said base portion, said leg portions being continuous over the lengths of said strips.

5. The mounting for a load carrying web in a vehicle seat set forth in claim 1 wherein at least one of said side rails is provided with a down-turned extension on said upper flange and the strip hooked over said flange has a pair of generally parallel upright legs which straddle said flange extension.

* * * * *